(12) United States Patent
Gashler et al.

(10) Patent No.: US 12,111,974 B1
(45) Date of Patent: *Oct. 8, 2024

(54) WEARABLE GESTURE DETECTOR

(71) Applicant: ZEIT TECHNOLOGIES CORPORATION, St. Claire Shores, MI (US)

(72) Inventors: Jessie Cole Gashler, McCook, NE (US); Pedro Flores Ziese de Oliveira, St. Claire Shores, MI (US); Danial Jameel, Boucherville (CA)

(73) Assignee: ZEIT TECHNOLOGIES CORPORATION, St. Claire Shores, MI (US)

(*) Notice: Subject to any disclaimer, the term of this patent is extended or adjusted under 35 U.S.C. 154(b) by 274 days.

This patent is subject to a terminal disclaimer.

(21) Appl. No.: 17/933,541

(22) Filed: Sep. 20, 2022

Related U.S. Application Data

(63) Continuation-in-part of application No. 17/332,760, filed on May 27, 2021, now Pat. No. 11,460,919.

(60) Provisional application No. 63/161,762, filed on Mar. 16, 2021.

(51) Int. Cl.
*G06F 3/01* (2006.01)
*G06F 1/16* (2006.01)
*G06F 3/0346* (2013.01)

(52) U.S. Cl.
CPC .............. *G06F 3/017* (2013.01); *G06F 1/163* (2013.01); *G06F 3/014* (2013.01); *G06F 3/0346* (2013.01)

(58) Field of Classification Search
CPC .......... G06F 3/017; G06F 1/163; G06F 3/011; G06F 3/014
See application file for complete search history.

(56) References Cited

U.S. PATENT DOCUMENTS

| | | | | |
|---|---|---|---|---|
| 6,244,873 B1* | 6/2001 | Hill | ......................... | G06F 3/017 434/258 |
| 7,101,287 B1* | 9/2006 | Wagner | .............. | A63B 71/0686 473/207 |
| 8,292,833 B2* | 10/2012 | Son | ........................ | A61B 5/681 600/407 |
| 8,704,757 B2* | 4/2014 | Kurashima | ............. | G06F 3/014 345/157 |
| 9,389,694 B2* | 7/2016 | Ataee | ....................... | G06F 3/015 |
| 9,483,123 B2* | 11/2016 | Aleem | .................... | G06F 3/014 |
| 9,971,313 B2* | 5/2018 | Chung | .................... | G06F 1/163 |
| 9,971,448 B2* | 5/2018 | Franklin | ................. | G06F 3/044 |
| 10,137,362 B2* | 11/2018 | Buchanan, IV | ........ | G06F 3/014 |

(Continued)

FOREIGN PATENT DOCUMENTS

CN 211653622 U 10/2020

*Primary Examiner* — Patrick F Marinelli
(74) *Attorney, Agent, or Firm* — Nasr Patent Law LLC; Faisal K. Abou-Nasr

(57) ABSTRACT

A wearable gesture detector includes a wristband with a plurality of pressure-sensitive conductive pads coupled to the wristband. The pressure-sensitive conductive pads are configured to detect epidermal deformations caused by muscular contraction or extension during a hand gesture. The wearable gesture detector further includes a controller communicatively coupled to the pressure-sensitive conductive pads. The controller is configured to collect hand gesture data samples based on the epidermal deformations detected by the plurality of pressure-sensitive conductive pads.

17 Claims, 15 Drawing Sheets

(56) References Cited

U.S. PATENT DOCUMENTS

| | | | |
|---|---|---|---|
| 10,191,574 B2 * | 1/2019 | Shin | H04M 1/05 |
| 10,199,008 B2 * | 2/2019 | Aleem | G06F 3/015 |
| 10,296,097 B2 * | 5/2019 | Bhageria | G06F 3/011 |
| 10,488,937 B2 * | 11/2019 | Krasnow | A61B 8/467 |
| 10,884,504 B2 * | 1/2021 | Kim | G06F 3/017 |
| 11,106,273 B2 * | 8/2021 | Hazra | G06F 3/017 |
| 11,347,318 B2 * | 5/2022 | Kwak | G01L 1/22 |
| 11,385,723 B2 * | 7/2022 | Nakamura | G06F 3/014 |
| 11,460,919 B1 * | 10/2022 | Gashler | G06F 3/0346 |
| 11,783,627 B2 * | 10/2023 | Dagdeviren | G06V 40/174 382/103 |
| 2015/0084860 A1 | 3/2015 | Aleem | G06F 3/011 345/156 |
| 2015/0109202 A1 * | 4/2015 | Ataee | G06F 3/015 345/156 |
| 2015/0215443 A1 * | 7/2015 | Heo | H04M 1/05 455/556.1 |
| 2015/0220154 A1 * | 8/2015 | Midholt | G06F 3/011 345/156 |
| 2015/0277575 A1 * | 10/2015 | Ataee | G06F 3/016 345/156 |
| 2015/0323998 A1 * | 11/2015 | Kudekar | G06F 1/163 345/156 |
| 2016/0187973 A1 * | 6/2016 | Shankar | G06F 3/014 345/156 |
| 2016/0284971 A1 * | 9/2016 | Hong | H10N 30/302 |
| 2016/0299570 A1 * | 10/2016 | Davydov | G06F 3/167 |
| 2016/0313791 A1 * | 10/2016 | Kirilenko | G06F 3/016 |
| 2016/0357265 A1 * | 12/2016 | Maani | G06F 1/163 |
| 2017/0123487 A1 * | 5/2017 | Hazra | G06F 3/0482 |
| 2017/0161720 A1 * | 6/2017 | Xing | G06Q 20/3829 |
| 2017/0293740 A1 * | 10/2017 | Xing | G06Q 20/204 |
| 2017/0323285 A1 * | 11/2017 | Xing | G06Q 20/321 |
| 2018/0018070 A1 * | 1/2018 | Bhageria | G06F 3/017 |
| 2018/0143697 A1 * | 5/2018 | Kim | G06F 3/011 |
| 2018/0306568 A1 * | 10/2018 | Holman | G06F 3/0414 |
| 2019/0033967 A1 * | 1/2019 | Morun | A61B 5/681 |
| 2019/0227665 A1 * | 7/2019 | Holman | G06F 3/044 |
| 2019/0250708 A1 * | 8/2019 | Gupta | G02B 27/017 |
| 2020/0272241 A1 * | 8/2020 | Kwak | G06F 3/017 |
| 2021/0109595 A1 * | 4/2021 | Landemaine | G06F 3/017 |
| 2021/0256246 A1 * | 8/2021 | Dagdeviren | G06V 40/172 |
| 2022/0054028 A1 * | 2/2022 | Ajima | A61B 5/02108 |
| 2023/0072423 A1 * | 3/2023 | Osborn | G16H 20/30 |

\* cited by examiner

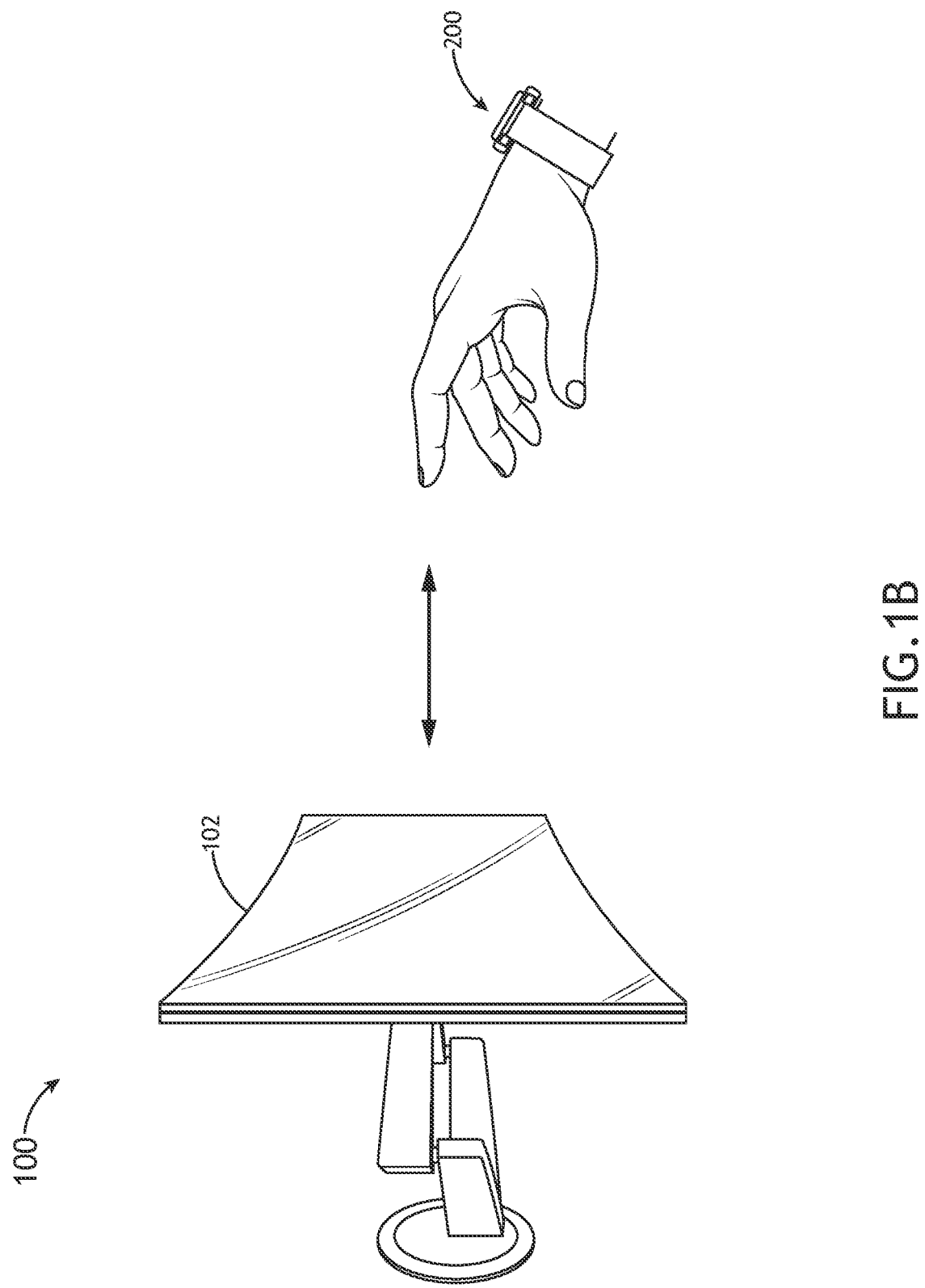

WEARABLE GESTURE DETECTOR

CROSS-REFERENCE TO RELATED APPLICATIONS

The present application is a Continuation-in-Part of U.S. Nonprovisional application Ser. No. 17/332,760, filed May 27, 2021, and titled "WEARABLE GESTURE DETECTOR," which claims the benefit under 35 U.S.C. § 119 (e) of U.S. Provisional Application No. 63/161,762, filed Mar. 16, 2021, and titled "WEARABLE GESTURE DETECTOR," all of which are incorporated herein by reference in their entirety.

TECHNICAL FIELD

The present disclosure relates to human machine interfaces and, more particularly, to wearable devices for detecting user movements and hand gestures as machine inputs.

BACKGROUND

There are a number of gesture detectors that use cameras and/or inertial sensors (e.g., accelerometers or gyroscopes) to detect user movements and hand gestures. The existing gesture detectors are good at sensing limb movements (e.g., arm motion, hand waving, etc.) but have limited ability to detect fine hand or finger movements and/or require that the user be within a camera's field of view (FOV). Consequently, there is a need for improved gesture detectors to overcome the foregoing limitations.

SUMMARY

Aspects of this disclosure are directed to a wearable gesture detector. In embodiments, the wearable gesture detector includes a wristband with a plurality of pressure-sensitive conductive pads coupled to the wristband. The pressure-sensitive conductive pads are configured to detect epidermal deformations caused by muscular contraction or extension during a hand gesture. The wearable gesture detector further includes a controller communicatively coupled to the pressure-sensitive conductive pads. The controller is configured to collect hand gesture data samples based on the epidermal deformations detected by the plurality of pressure-sensitive conductive pads.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 1B is another environmental view of the system, wherein the wearable gesture detector is being used to sense a hand gesture or movement, in accordance with one or more embodiments of this disclosure.

In FIG. 2D, the distance between a controller unit and the pressure-sensitive conductive pads is not drawn to scale.

DETAILED DESCRIPTION

Reference will now be made in detail to the subject matter disclosed, which is illustrated in the accompanying drawings.

FIGS. 1A through 4E illustrate embodiments of a wearable gesture detector 200 and a gesture-controlled system 100 that employs the wearable gesture detector 200 to receive input signals (e.g., control signals, activity tracking signals, etc.) for a data utility device 102 based on detected arm, wrist, hand and/or finger movements of a user. For example, the wearable gesture detector 200 may detect hand gestures, such as extending or retracting one or more of a user's fingers (e.g., as shown in FIG. 1B), flicking or bending the user's wrist (e.g., as shown in FIG. 1C), raising, lowering, or otherwise moving the user's forearm (e.g., as shown in FIG. 1D), or any combination thereof.

Figure 1A:
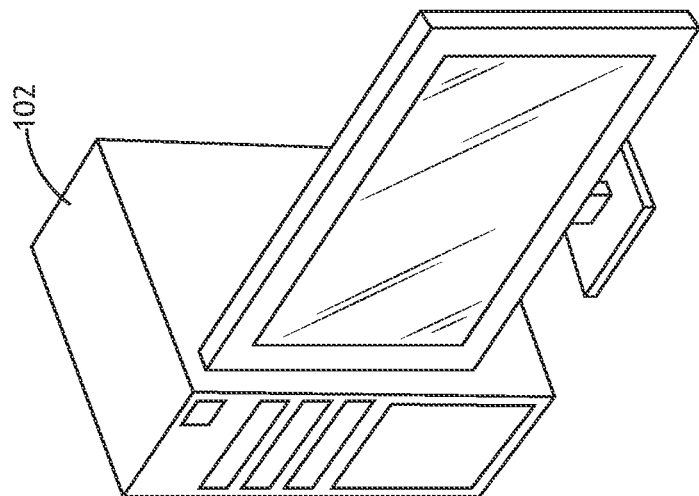
FIG. 1A is an environmental view of a system that includes a wearable gesture detector, in accordance with one or more embodiments of this disclosure.
Figure 1A:
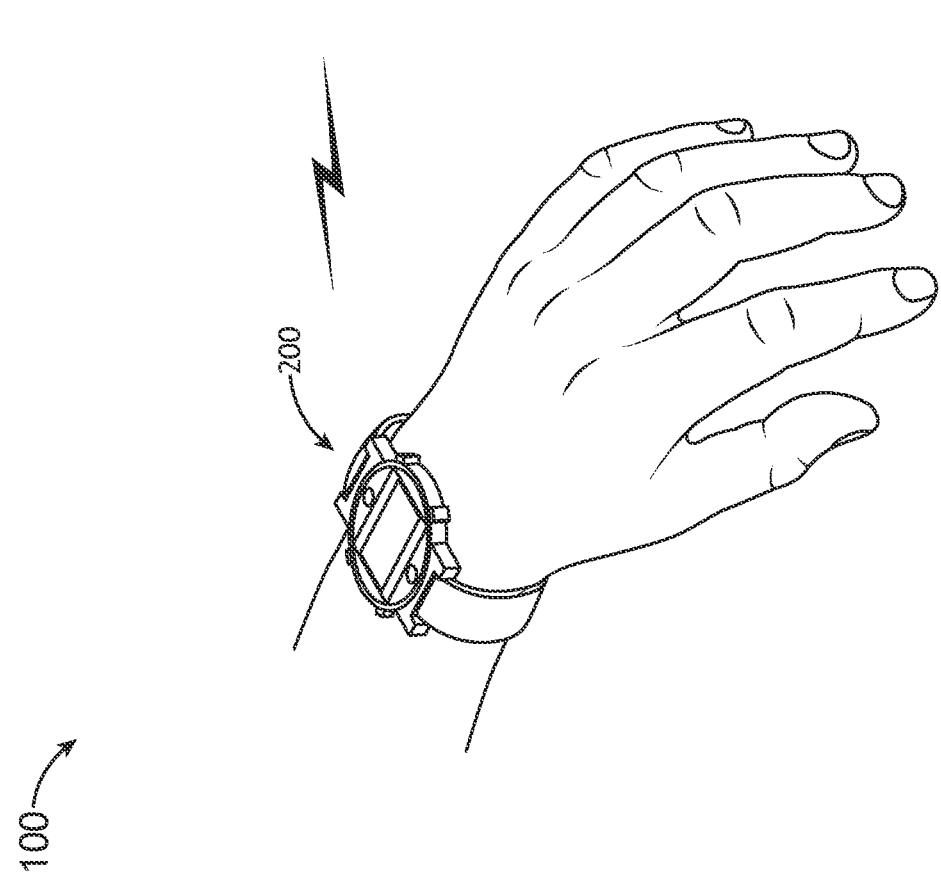
Figure 1C:
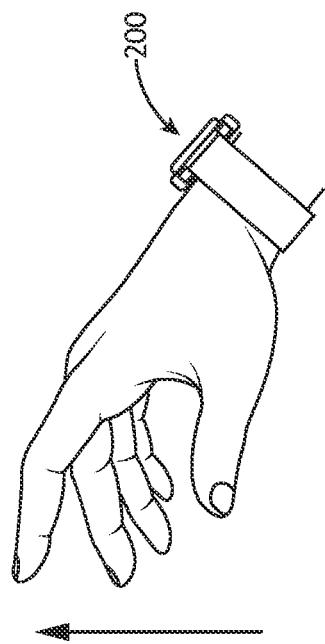
FIG. 1C is another environmental view of the system, wherein the wearable gesture detector is being used to sense another hand gesture or movement, in accordance with one or more embodiments of this disclosure.
Figure 1C:
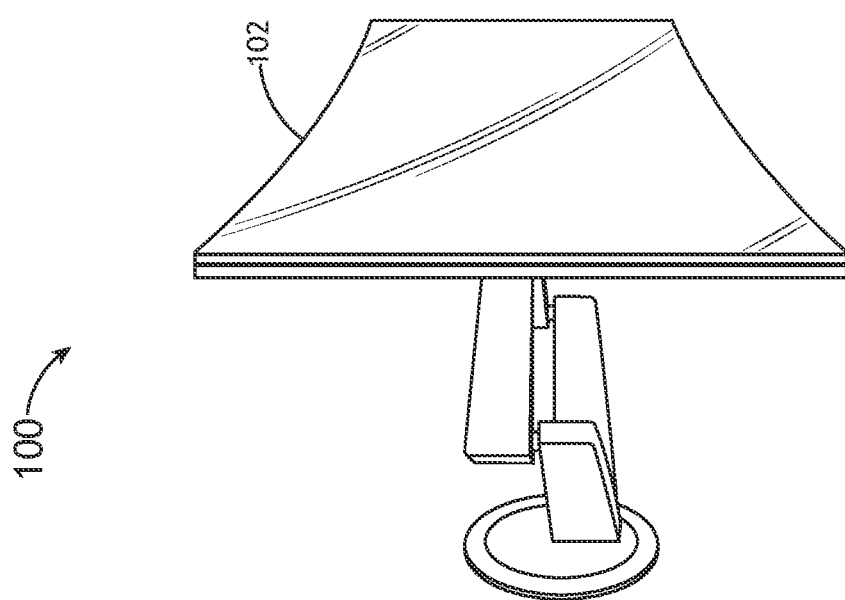
Figure 1D:
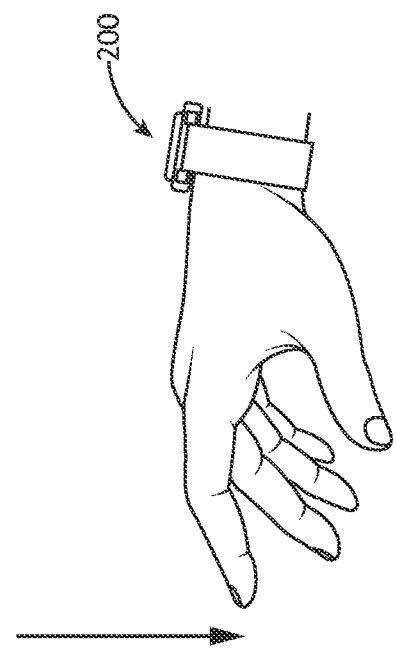
FIG. 1D is another environmental view of the system, wherein the wearable gesture detector is being used to sense another hand gesture or movement, in accordance with one or more embodiments of this disclosure.
Figure 1D:
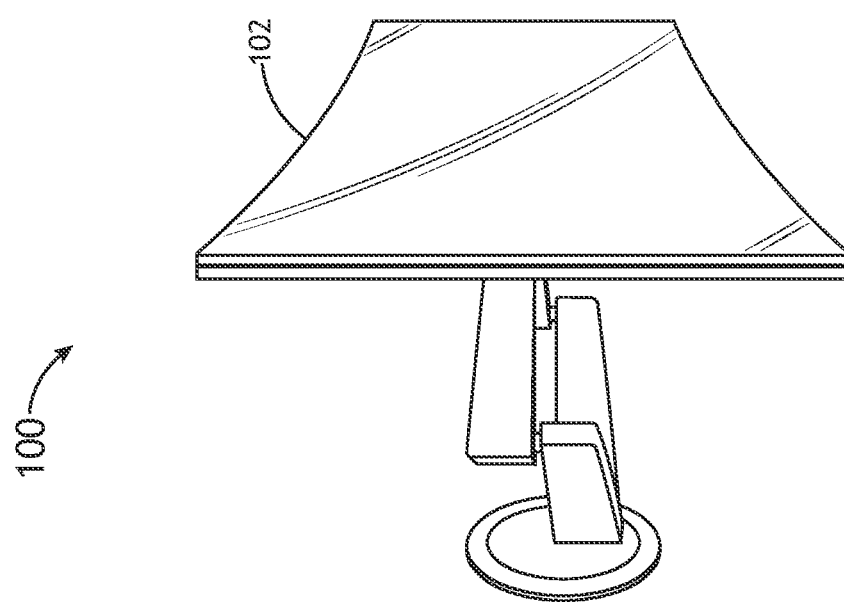
Figure 2A:
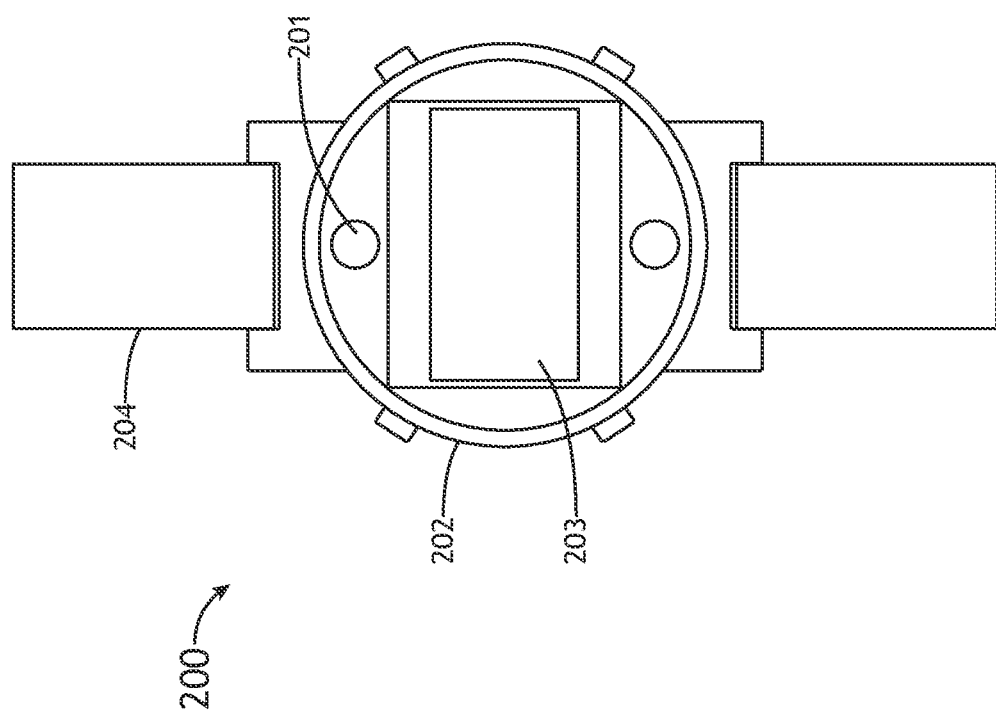
FIG. 2A is a top view of the wearable gesture detector, in accordance with one or more embodiments of this disclosure.
Figure 4A:
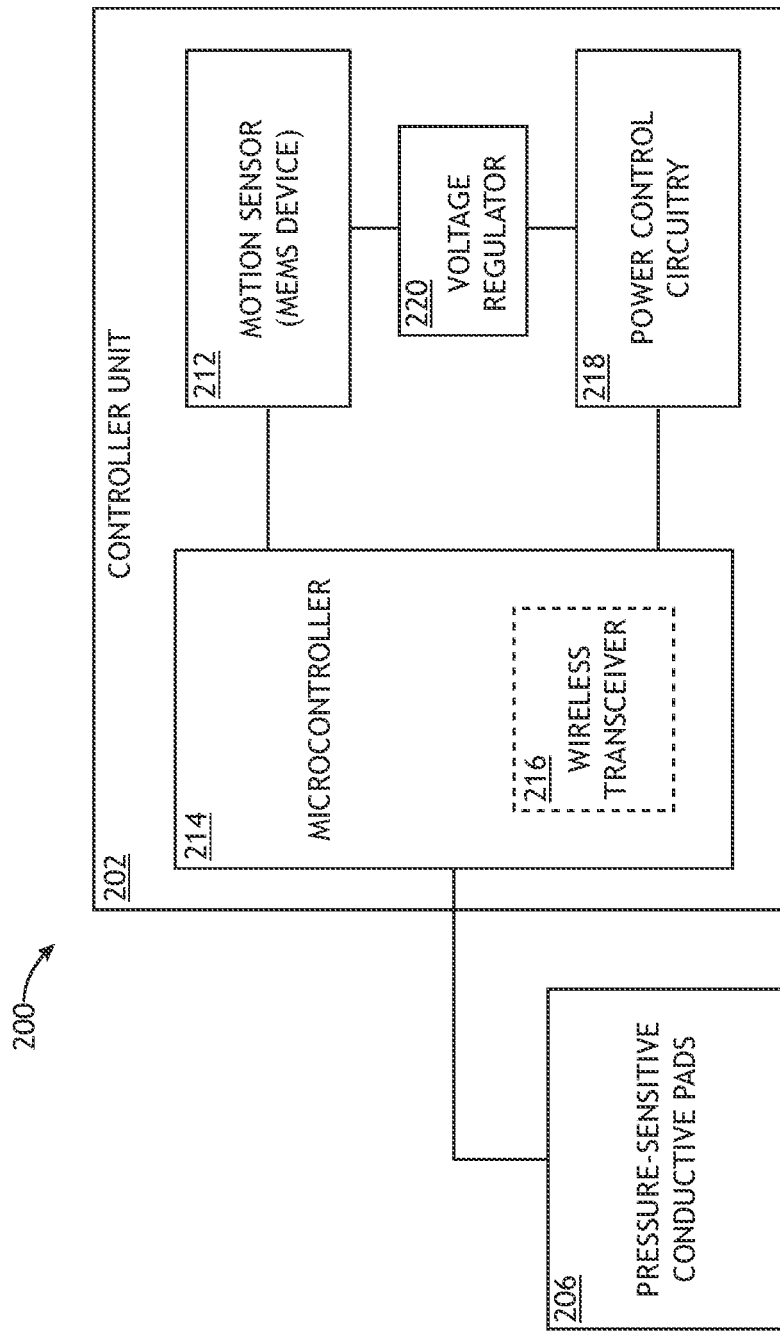
FIG. 4A is a block diagram illustrating various components of the controller unit, in accordance with one or more embodiments of this disclosure.

As shown in FIGS. 2A and 4A, the wearable gesture detector 200 includes a wristband 204 coupled to a controller unit 202. The controller unit 202 is configured to house a microcontroller 214 (e.g., ESP32 MCU illustrated in FIG. 4B) and associated circuitry for the wearable gesture detector 200 (e.g., motion sensor 212 circuitry illustrated in FIG. 4C, power control circuitry 218 illustrated in FIG. 4D, and so forth). The power control circuitry 218 may include a charging circuit configured to charge a battery in the controller unit 202 via a conventional charging interface (e.g., standard power connector, USB, micro-USB, USB-C, or the like). Alternatively, the power control circuitry 218 may include a wireless charging IC. The wireless charging IC may be integrated with means (e.g., RF shielding or another type of RF signal isolation) for preventing interference with the magnetometer of the motion sensor 212. In some embodiments, the power control circuitry 218 is configured to output 3.3V power signal that can be used directly by the microcontroller 214, and as shown in FIGS. 4A and 4C, the controller unit 202 may include a voltage regulator 220 that is configured to step down the power signal to 1.8V for the motion sensor 212. The controller unit 202 may also include user interface components (e.g., one or more buttons 201, a display 203, and/or any other user interface devices, such as a microphone, touchscreen, touch panel, touch pad, speaker or other audio feedback device, tactile feedback device, etc.). In some embodiments, the display 203 may comprise a full color display integrated into the controller unit 202 and connected to the microcontroller 214 via 4 wire serial peripheral interface (SPI), and the one or more buttons 201 may include at least one pushbutton on the face of the housing that can be used to wake up the controller unit 202, put it into sleep mode to save power, or for pairing and connectivity functions.

As shown in FIGS. 2B through 2E, the wristband 204 has a plurality of pressure-sensitive conductive pads 206 coupled to the wristband 204. In embodiments, the pressure-sensitive conductive pads 206 are sown, adhered, or otherwise fastened to an inner surface of the wristband 204. The pressure-sensitive conductive pads 206 are configured to detect epidermal deformations (e.g., skin movement and/or changes in skin surface tension) caused by muscular contraction or extension during a hand gesture. The controller unit 202 is communicatively coupled to the pressure-sensitive conductive pads 206. The controller unit 202 is configured to collect hand gesture data samples based on the epidermal deformations detected by the plurality of pressure-sensitive conductive pads 206.

Figure 2B:
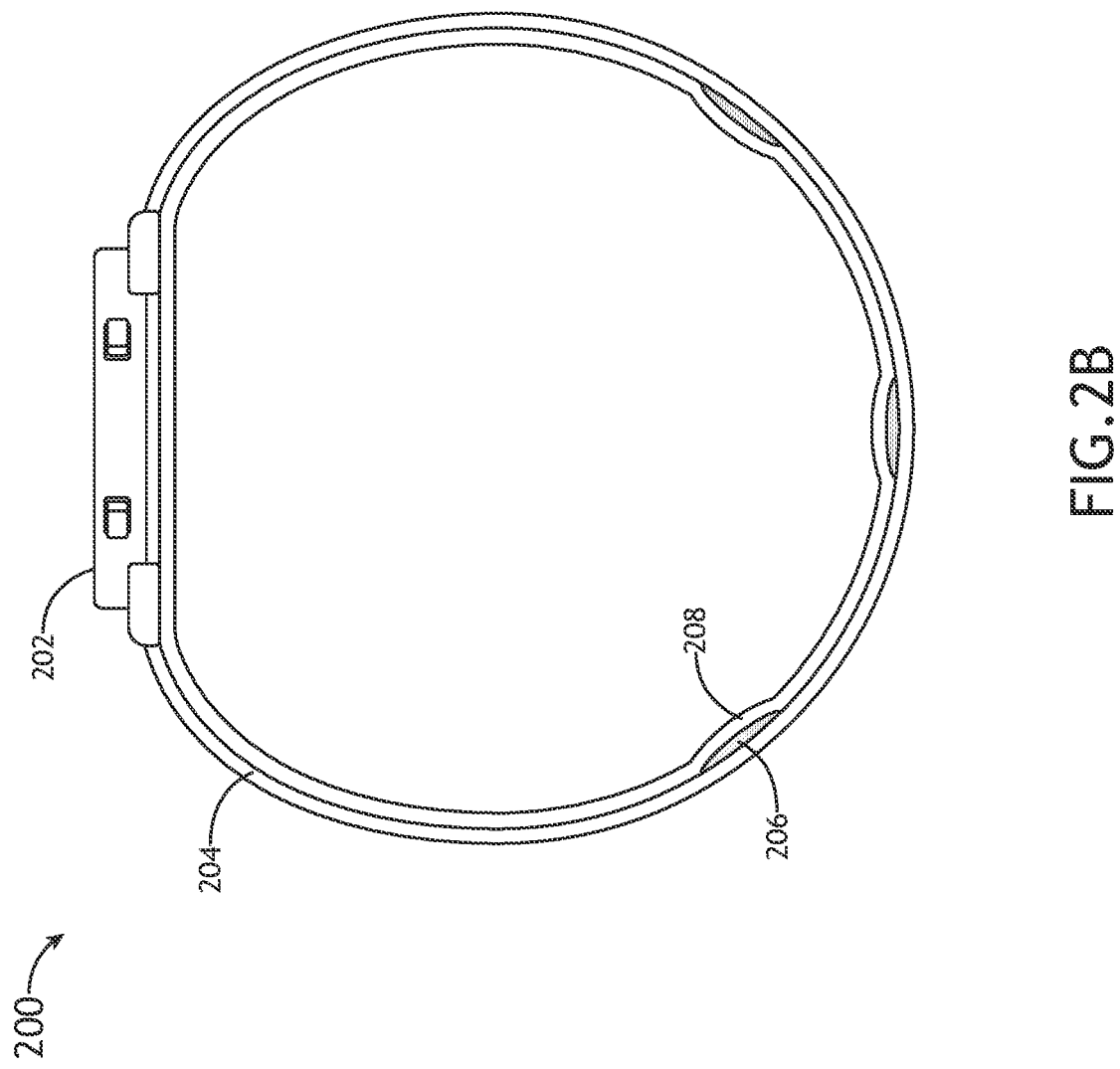
FIG. 2B is a side view of the wearable gesture detector, including a plurality of pressure-sensitive conductive pads positioned along a bottom portion of a wristband, in accordance with one or more embodiments of this disclosure.

In embodiments, the pressure-sensitive conductive pads 206 are formed from cutout portions of a pressure-sensitive conductive sheet (e.g., Velostat, also known as Linqstat). As shown in FIGS. 2B and 2D, the pressure-sensitive conductive pads 206 may include at least three pressure-sensitive conductive pads 206 located along a bottom portion of the wristband 204 configured to contact a ventral surface of a forearm or wrist. For example, one pressure-sensitive conductive pad 206 may be configured to contact a central portion of the ventral surface of the wrist, while two other pressure-sensitive conductive pads 206 are configured to contact the ventral surface near right and left sides of the wrist. It is noted that in FIG. 2D the distance between the controller unit 202 and the pressure-sensitive conductive pads 206 and the spacing between the pressure-sensitive conductive pads 206 is not drawn to scale, as the distance between the controller unit 202 and the pressure-sensitive conductive pads 206 and the spacing between the pressure-sensitive conductive pads 206 is actually much greater than the distances and spacings illustrated in FIG. 2D (e.g., more like the distances and spacings shown in FIG. 2B).

Figure 2C:
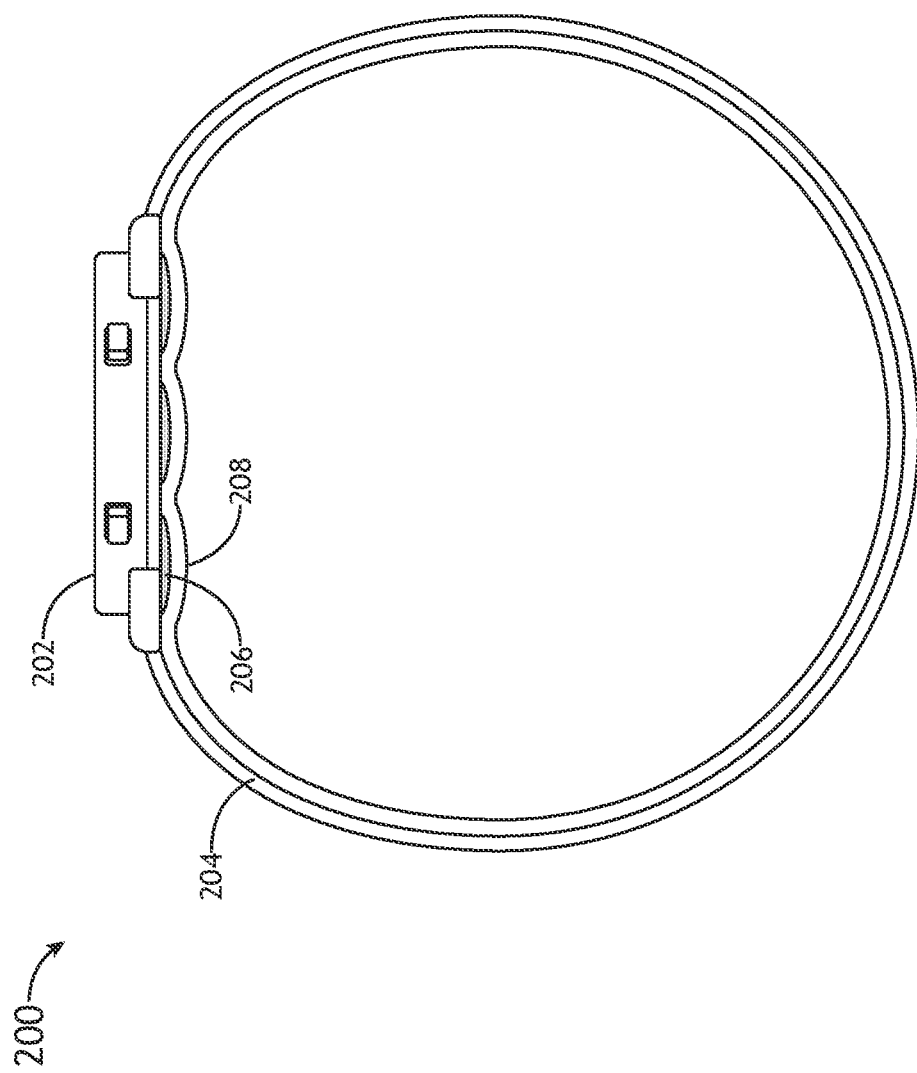
FIG. 2C is a side view of the wearable gesture detector, wherein the pressure-sensitive conductive pads are positioned along a top portion of the wristband, in accordance with one or more embodiments of this disclosure.
Figure 2D:
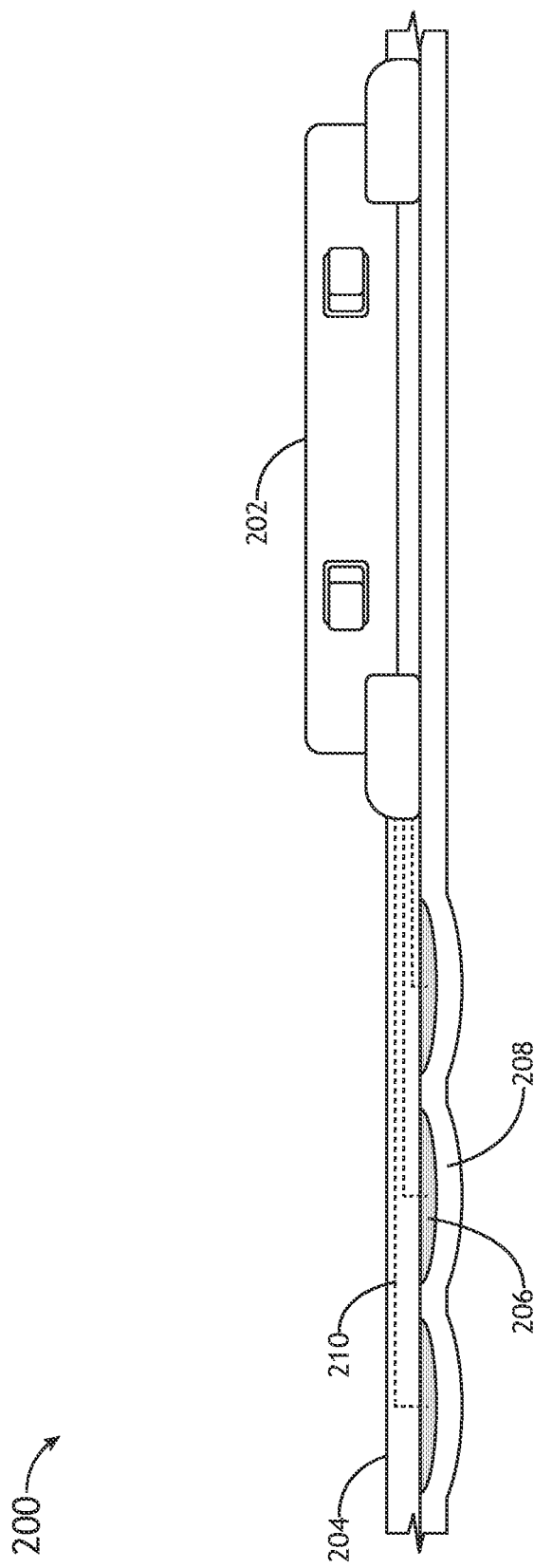
FIG. 2D is a zoomed-in side view of the wearable gesture detector as illustrated in FIG. 2B, in accordance with one or more embodiments of this disclosure.
Figure 2E:
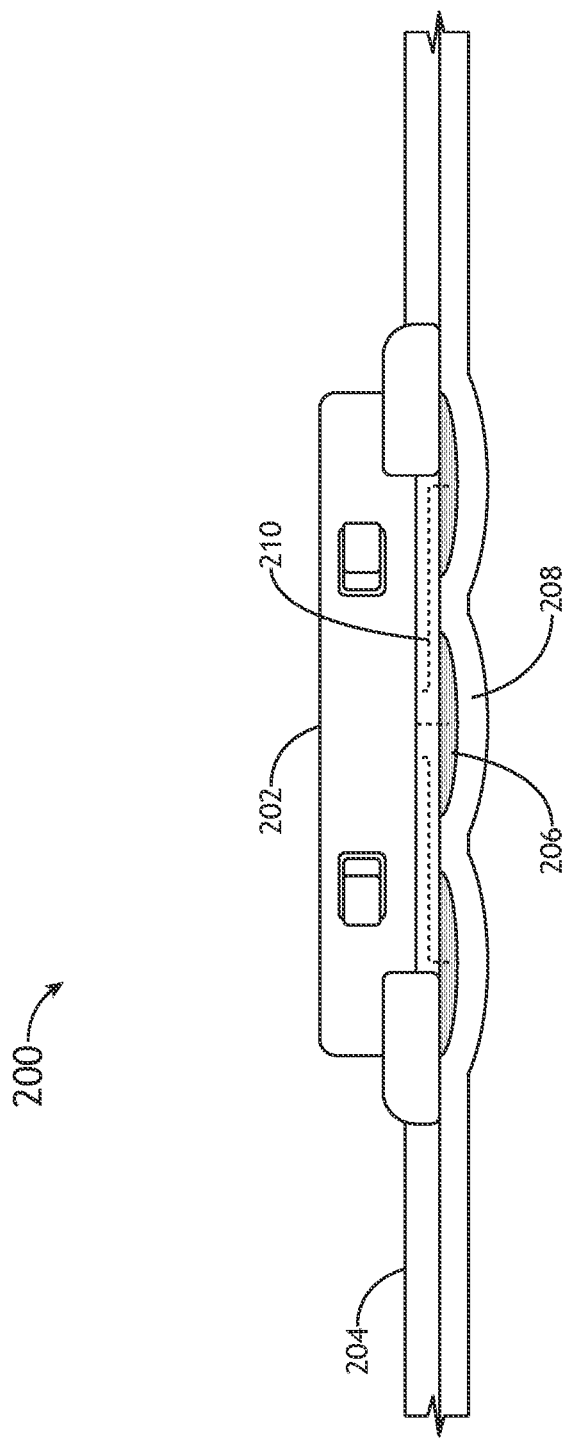
FIG. 2E is a zoomed-in side view of the wearable gesture detector as illustrated in FIG. 2E, in accordance with one or more embodiments of this disclosure.

As shown in FIGS. 2C and 2E, the pressure-sensitive conductive pads 206 can alternatively be located along a top portion of the wristband 204 that is configured to contact a dorsal surface of a forearm or wrist. For example, one pressure-sensitive conductive pad 206 may be configured to contact a central portion of the dorsal surface of the wrist, while two other pressure-sensitive conductive pads 206 may be configured to contact the dorsal surface near right and left sides of the wrist. In this configuration, the pressure-sensitive conductive pads 206 may be placed closer together. In other embodiments, the wearable gesture detector 200 may include pressure-sensitive conductive pads 206 located along top and bottom portions of the wristband 204 (e.g., three on top and three on bottom, or any other combination).

As shown in FIGS. 2D and 2E, the controller unit 202 may be coupled to the pressure-sensitive conductive pads 206 by a plurality of connectors 210 (e.g., conductive wires or traces) disposed upon or formed through the wristband 204. In some embodiments, the wearable gesture detector 200 further includes one or more layers of fabric 208 covering the pressure-sensitive conductive pads 206. This may help shield the pressure-sensitive conductive pads 206, but more importantly, the addition of a fabric layer 208 between the pressure-sensitive conductive pads 206 and the user's skin has been found to increase the sensitivity of the pressure-sensitive conductive pads 206 to epidermal deformations caused by muscular contraction or extension during a hand gesture.

Figure 3:
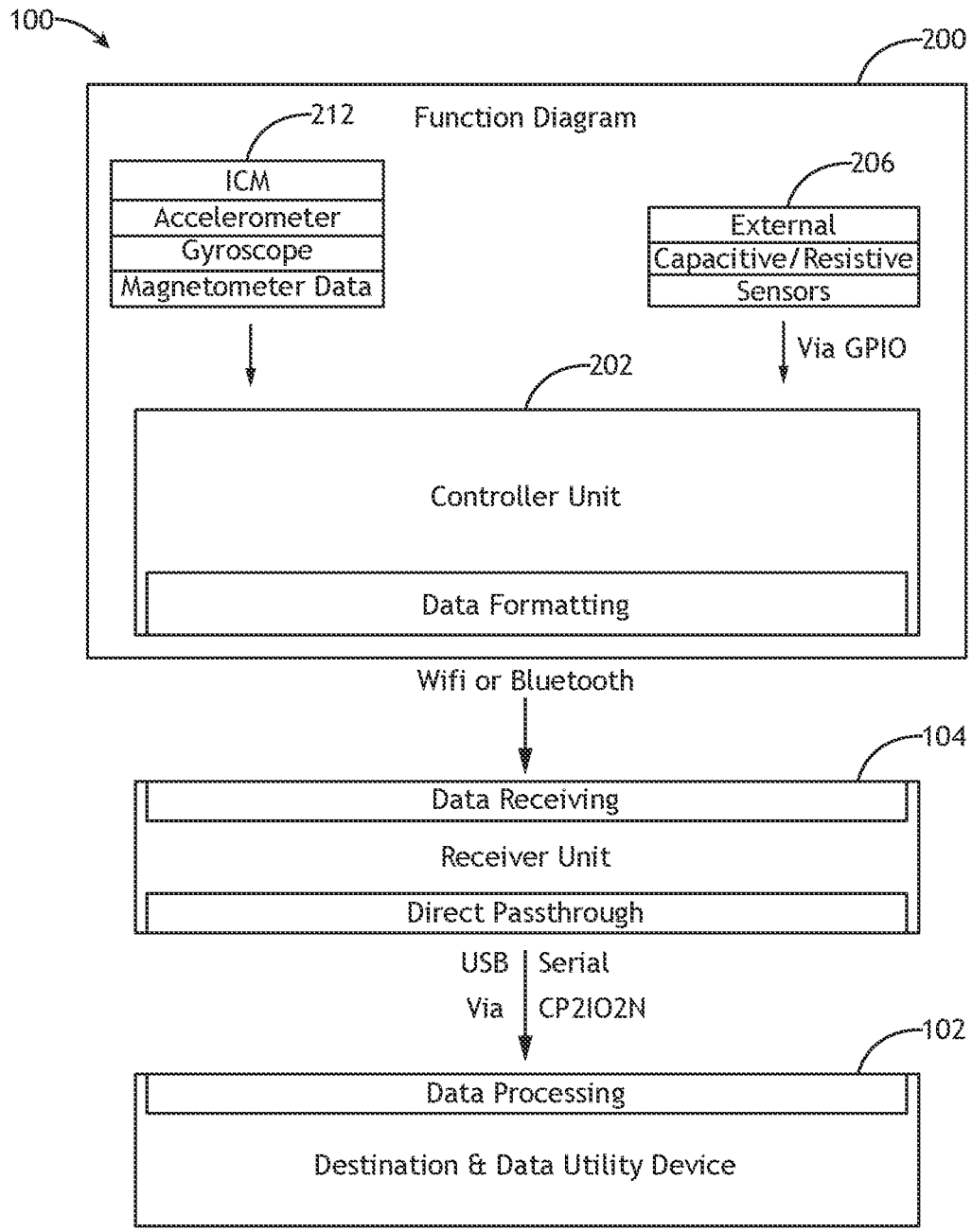
FIG. 3 is a block diagram illustrating data flow within a gesture controlled system including the wearable gesture detector, a receiver unit, and a data utility device, in accordance with one or more embodiments of this disclosure.

FIG. 3 is a block diagram illustrating data flow within a gesture controlled system 100 including the wearable gesture detector 200, a receiver unit 104, and a data utility device 102, in accordance with one or more embodiments of this disclosure.

FIG. 4A is a block diagram illustrating various components of the controller unit 202, in accordance with one or more embodiments of this disclosure.

Referring to FIGS. 3 and 4A, the wearable gesture detector 200 may further include a motion sensor 212 integrated within or coupled to the controller unit 202. The motion sensor 212 may be configured to detect changes in position and/or orientation during the hand gesture. In embodiments, the microcontroller 214 (e.g., ESP32 MCU illustrated in FIG. 4B) of the controller unit 202 is communicatively coupled to the motion sensor 212 (e.g., ICM-20948 9-axis motion tracking MEMS device illustrated in FIG. 4C). For example, the motion sensor 212 may be communicatively coupled to the microcontroller 214 via physical interface connections (e.g., wires, pins, sockets, etc.) including a clock synchronization interface connection (SCL), a data interface connection (SDA), and an interrupt interface connection (INT). The microcontroller 214 may be configured to generate hand position and/or orientation coordinates based on the detected changes in position and/or orientation.

In embodiments, the motion sensor 212 may be a multi-axis motion sensor that includes a gyroscope, and accelerometer, and a magnetometer. In some embodiments, the controller unit 212 may further include additional means (e.g., wireless transceiver 216 or an additional wireless transceiver) for position tracking through the use of Ultra-Wide Band (UWB) technology that would allow for refined position tracking using trilateration.

The wearable gesture detector 200 may further include a wireless transmitter/transceiver configured to send the hand gesture data samples to a data utility device 102 for additional processing and/or to be used as an input for the data utility device 102. For example, the controller unit 202 may include a wireless transmitter/transceiver 216 configured to transmit data samples over Wifi, Bluetooth, NFC, or any other wireless communication protocol. As shown in FIG. 4A, the wireless transmitter/transceiver 216 may be integrated within the microcontroller 214. In embodiments, the wireless transmitter/transceiver 216 may be configured to communicate with a receiver unit 104 for the data utility device 102 (e.g., a built-in receiver unit or an externally coupled receiver unit). FIG. 4E is a circuit diagram for the receiver unit 104, in accordance with one or more embodiments of this disclosure. In some embodiments, the receiver unit 104 also includes a microcontroller (e.g., ESP32 MCU) with an integrated wireless receiver/transceiver that is configured to communicate with the integrated wireless transmitter/transceiver 216 of the microcontroller 214 of the controller unit 202.

The data utility device 102 may be configured to determine a hand gesture based on the hand gesture data samples and/or perform one or more operations based on the hand gesture data samples. For example, operations may include, but are not limited to: executing a program instruction; generating a control signal based on the hand gesture or hand gesture data samples; and/or generating a graphical output indicative of the hand gesture.

The data utility device 102 may include any controller or device that is configured to perform operations based on the hand gesture data samples. For example, the data utility device may include, but is not limited to, a personal computer, a mobile device, a gaming or media console, a smart television, a robotics controller, or a kinematics controller.

Figure 4B:
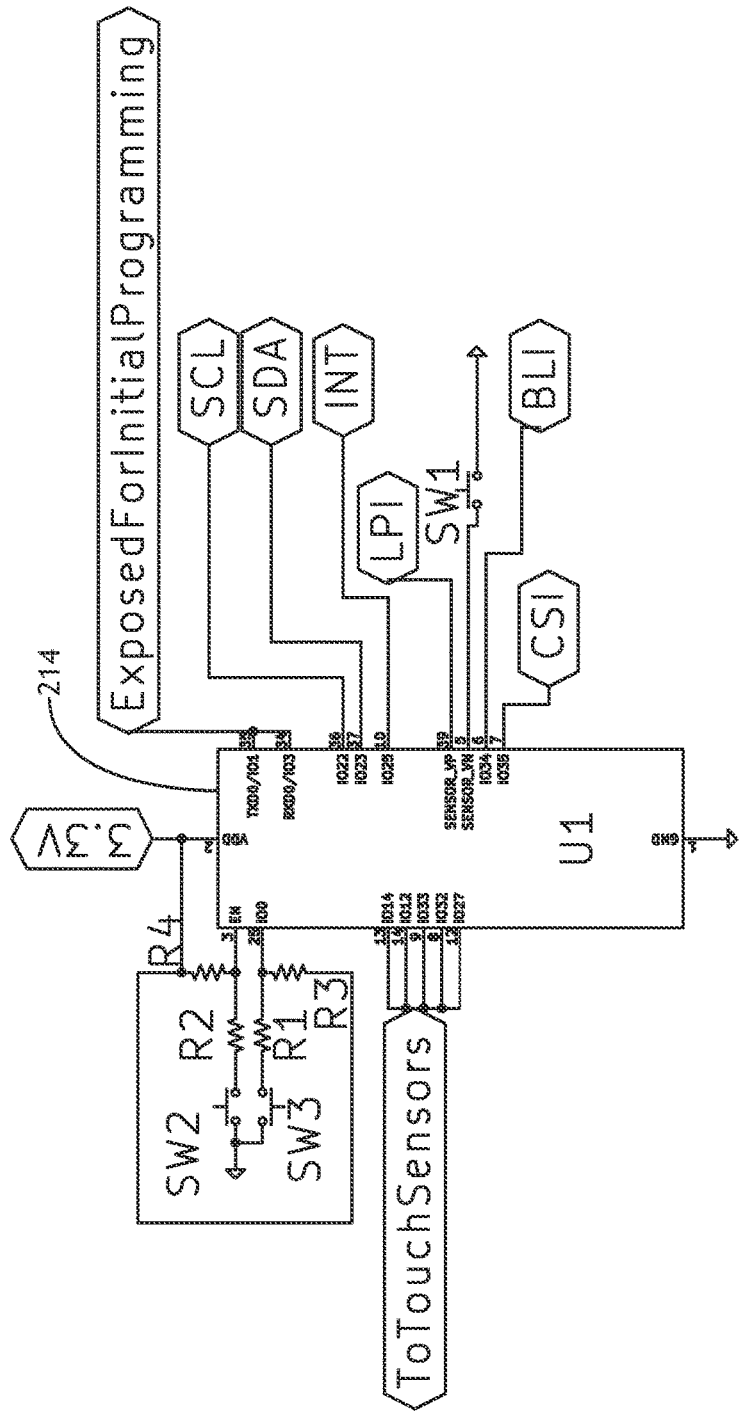
FIG. 4B is a circuit diagram for a microcontroller that operations as the main controller of the controller unit of the wearable gesture detector, which is configured to collect data samples from the pressure-sensitive conductive pads via capacitive touch sensor inputs of the controller, in accordance with one or more embodiments of this disclosure.
Figure 4C:
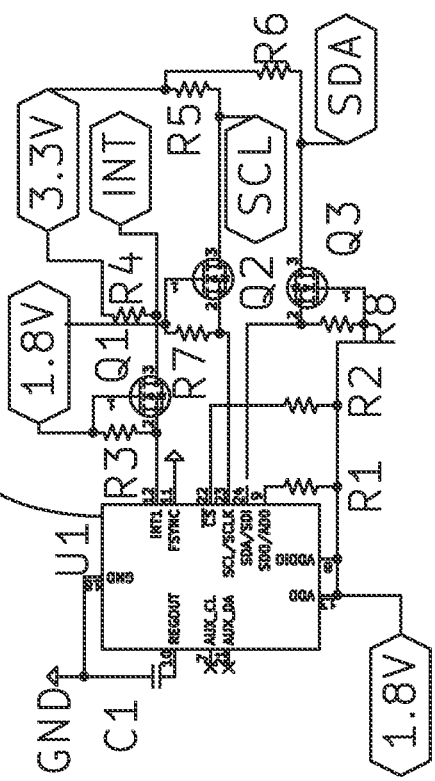
FIG. 4C is a circuit diagram for a motion sensor that is integrated within or communicatively coupled to the controller unit of the wearable gesture detector, in accordance with one or more embodiments of this disclosure.
Figure 4D:
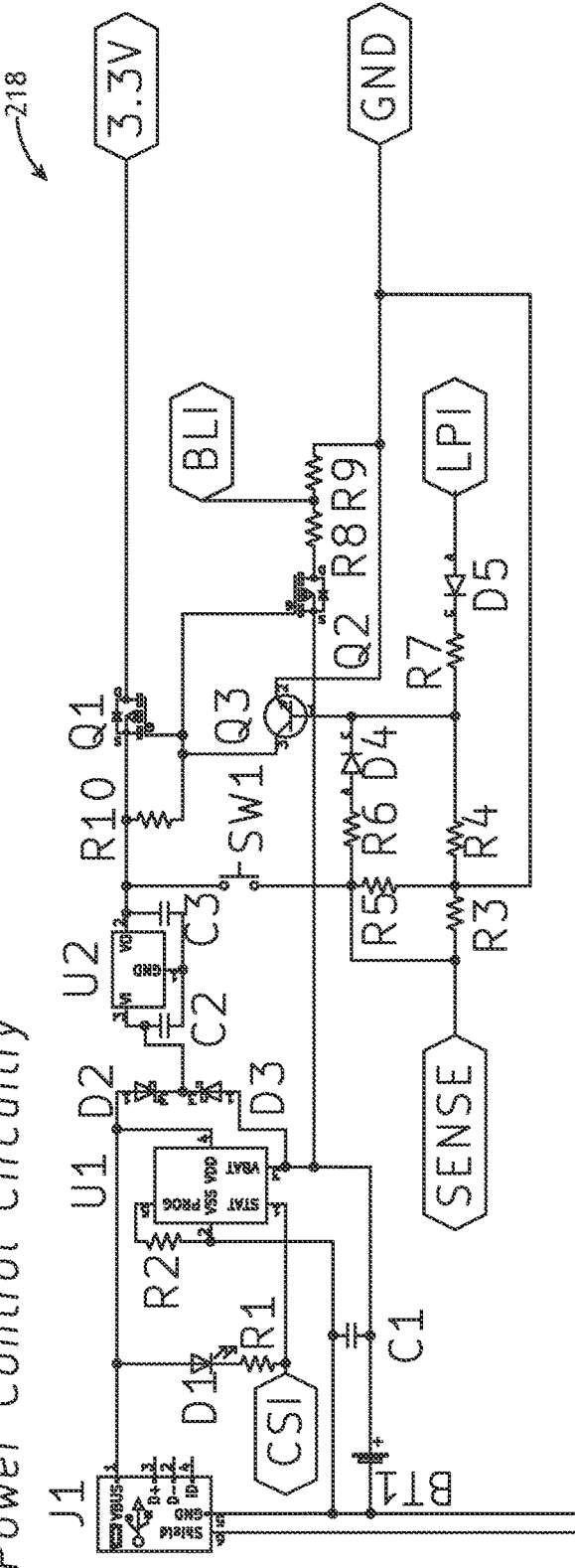
FIG. 4D is a circuit diagram for a power control circuit that is integrated within or communicatively coupled to the controller unit of the wearable gesture detector, in accordance with one or more embodiments of this disclosure.
Figure 4E:
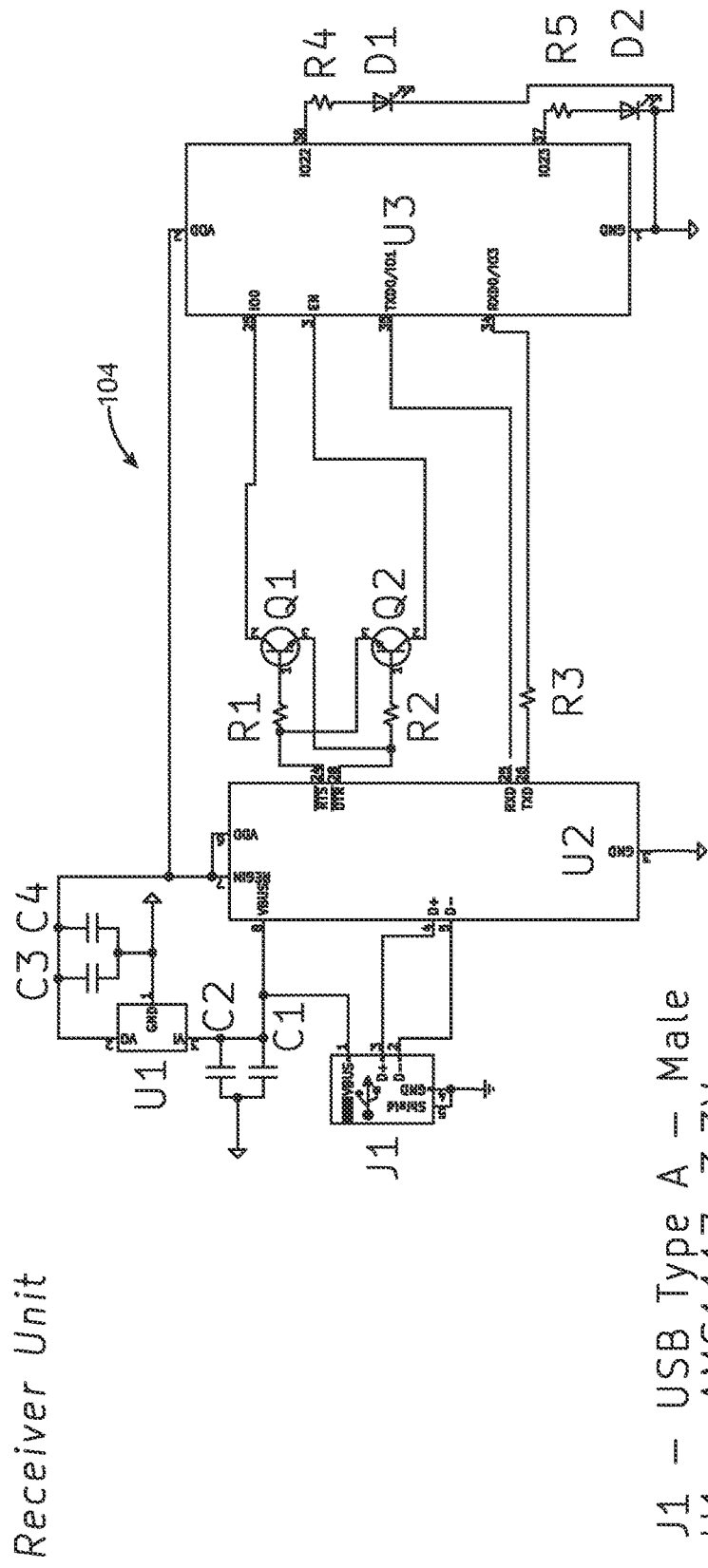
FIG. 4E is a circuit diagram for the receiver unit of the gesture-controlled system, which is configured to receive data samples from the controller unit of the wearable gesture detector, in accordance with one or more embodiments of this disclosure.

FIG. 4B is a circuit diagram for the microcontroller 214 (e.g., ESP32 MCU) of the controller unit 202 of the wearable gesture detector 200. In embodiments, the controller unit 202 is configured to collect data samples from the pressure-sensitive conductive pads 206 via capacitive touch sensor inputs (labeled in FIG. 4B as "ToTouchSensors" interface) of the controller. The capacitive sensing system that is used is similar to any common capacitive touch system in place today in devices such as smart phones and tablets. The primary difference is that the sensing system that is used in the wearable gesture detector 200 makes use of all values sensed at all times, while touch screens limit sensitivity to the portions or points of the interface that are actually being touched.

To explain, capacitance (C) is calculated using the formula: $C=E*(A/d)$, where E is defined as the relative permittivity of the dielectric material, A is defined as the surface area of the plates that are held on each end of the dielectric, and d is defined as the distance between the two plates.

The method that electronics use to measure touch and/or proximity using capacitance takes advantage of a property of combining capacitors with resistors. This property is known as RC time, which is the amount of time required for a capacitor to charge and then discharge when wired in series with a resistor. This property is well understood, and because of this it is possible to measure variances in either the resistance or the capacitance of the circuit to obtain meaningful data. If the resistance of the circuit is held constant, but capacitance is allowed to vary, then that variance can be calculated based upon the measured RC time for a given measurement.

In the current type of sensor system, there is a single plate that is exposed to open air. This gives us one of our plates, as well as a dielectric for our capacitor. From here, all that is needed is another plate. Human skin actually takes the place of the second plate as well as acting as a different dielectric material for the capacitor. The sensing system in the wearable gesture detector 200 takes advantage of two variables in the capacitance calculation equation, namely E and d. As the distance between the user's skin and the first plate changes, the capacitance also changes. This is coupled with a change in permittivity and thus provides two degrees of sensitivity for the measurements. Combining this with the fact that each pressure-sensitive conductive pad 206 (e.g., Velostat) is a conductor and also a variable resistor provides four degrees of sensitivity in the sensor system. This is the level of sensitivity needed in order to measure deformations of the surface of the skin around the wrist as different gestures are performed because not only does the surface of the skin deform; pressure is also applied in different places to the wristband 204 which interacts with the pressure-sensitive conductive pads 206 and effectively reduces the distance between the "plates" of the capacitor.

A method of using the wearable gesture detector 200 is described below.

In use, the wearable gesture detector 200 is worn by a user so that the wristband 204 surrounds at least a portion of the user's wrist and the plurality of pressure-sensitive conductive pads 206 are in contact with the user's skin. The pressure-sensitive conductive pads 206 may be in direct contact with the user's skin or indirect contact; for example, the fabric layer 208 may be disposed in between the pressure-sensitive conductive pads 206 and the user's skin.

The plurality of pressure-sensitive conductive pads 206 are used to detect epidermal deformations (e.g., skin movement and/or changes in skin surface tension) caused by muscular contraction or extension during a hand gesture. The microcontroller 214 in the controller unit 202 is configured to receive signals from the pressure-sensitive conductive pads 206 at capacitive touch sensor inputs of the microcontroller 214. The microcontroller 214 is then configured to generate data samples based on the epidermal deformations detected by the plurality of pressure-sensitive conductive pads 206. For example, the data samples may comprise integer values based on the signals from the pressure-sensitive conductive pads 206, which are associated with detected capacitance or changes in capacitance. In some embodiments, the microcontroller 214 is configured to output three integer values based on independent signals from each of three pressure-sensitive conductive pads 206 for each point in time or sample set.

The microcontroller 214 may be further configured to receive signals from the motion sensor 212 to supplement the hand gesture data samples. For example, the motion sensor 212 may be configured to detect changes in position and/or orientation during the hand gesture. Using signals from the motion sensor 212, the microcontroller 214 may be further configured to generate hand position and/or orientation coordinates based on the detected changes in position and/or orientation.

The microcontroller 214 is configured to wirelessly transmit the hand gesture data samples (with or without hand position and/or orientation coordinates) to the data utility device 102 for additional processing and/or to be used as an input for the data utility device 102. In embodiments, the data utility device 102 may be configured to determine a hand gesture based on the hand gesture data samples and/or perform one or more operations based on the hand gesture data samples. For example, operations may include, but are not limited to: executing a program instruction; generating a control signal based on the hand gesture or hand gesture data samples; and/or generating a graphical output indicative of the hand gesture.

Further embodiments of the wearable gesture detector 200 and gesture-controlled system 100 are described below, wherein the wearable gesture detector 200 and the gesture-controlled system 100 employ advanced data processing techniques and algorithms to improve system performance by optimizing data transmission of hand orientation data.

As discussed above, the motion sensor 212 may be configured to detect changes in orientation during a hand gesture. In embodiments, the motion sensor 212 is a multi-axis motion sensor, preferably an at least 9-axis motion sensor including an at least 3-axis gyroscope, an at least 3-axis accelerometer, and an at least 3-axis magnetometer.

The microcontroller 214, in addition to collecting hand gesture data samples based on the epidermal deformations detected by the plurality of pressure-sensitive conductive pads 206, may be further configured to collect hand orientation data in the form of quaternion samples based on the changes in orientation detected by the motion sensor 212.

The wireless transmitter/transceiver 216 may be configured to send the hand gesture data samples and the hand orientation data to the data utility device 102 for additional processing. In some embodiments, the microcontroller 214 may be configured to convert the quaternion samples into Euler angles (e.g., yaw, pitch, and roll information) before transmission to the data utility device 102. Alternatively, the wireless transmitter/transceiver 216 may be configured to transmit the hand orientation data to the data utility device 102 (or to an intermediate device) in the form of quaternion samples. In case of the latter, the data utility device 102 (or an intermediate) device may be configured to convert the quaternion samples into yaw, pitch, and roll information that can be used by the data utility device 102 in combination with the hand gesture data samples based on the epidermal deformations detected by the plurality of pressure-sensitive conductive pads 206 to determine a hand gesture.

The data utility device 102 may be configured to a data utility device configured to: receive the hand gesture data samples and the hand orientation data; determine a hand gesture based on the hand gesture data samples and the hand orientation data; and perform one or more operations based on the hand gesture.

In embodiments, quaternion samples are computed by the microcontroller 214 (or another controller/processor/programmable logic device in the controller unit 202) using an attitude and heading reference system (AHRS) algorithm, such as a Madgwick algorithm or a Mahony algorithm. Transmitting hand orientation data in the form of quaternion samples provides various computational advantages and increases overall efficiency of the system as explained below.

A multi-axis motion sensor (e.g., a 9-axis motion sensor) may provide orientation data that can be output in the form of a quaternion (i.e., raw, complex orientation data). This quaternion is computed by running all the axes (e.g., all 9 axes) of sensing (e.g., 3-axis gyroscope, 3-axis accelerometer, and 3-axis magnetometer readings) through an AHRS algorithm, such as the Madgwick algorithm or the Mahony algorithm. Information about the relevant algorithms and data processing techniques may be found in the work of E. M. Diaz, F. de Ponte Müller, A. R. Jiménez and F. Zampella, "Evaluation of AHRS algorithms for inertial personal localization in industrial environments," 2015 IEEE International Conference on Industrial Technology (ICIT), 2015, pp. 3412-3417, doi: 10.1109/ICIT.2015.7125605, which is incorporated herein by reference in its entirety. Utilizing these algorithms that take advantage of all 3 sensor groups provides a true world space relative orientation data because of fusing the magnetometer into the orientation which provides a reference to magnetic compass north.

Quaternion orientation is useful for avoiding gimbal lock in some applications, but the orientation needs to be more human readable for applications such as controlling a computer mouse. Compatibility for such applications can be achieved by converting the quaternion that represents orientation into Euler angles (i.e., yaw, pitch, and roll information) to simplify the orientation data for use by whatever system is receiving the orientation data. Doing this also decreases the amount of data that must be sent to the receiving device (e.g., data utility device 102) because a quaternion requires 4 pieces of 32 bits of data to be transmitted, whereas transmitting the Euler angles only requires the transmission of 3 pieces of 32 bits of data. However, converting the quaternion samples into yaw, pitch, and roll information is not an absolute requirement. In some applications, such as virtual reality (VR) gaming, the quaternion orientation data is more useful. In applications such as this, the wireless transmitter/transceiver 216 may be configured to transmit the hand orientation data to the data utility device 102 in pure quaternion form instead of transmitting the Euler angles.

In embodiments, the data utility device 102 may be configured and programmed such that when it initiates a connection to the wearable gesture detector 200 in order to facilitate user control of a given system, the data utility device 102 will transmit a set of bitmasks that the microcontroller 214 can use to determine what data needs to be transmitted to the data utility device 102 (e.g., Euler angles vs. quaternions).

Although the invention has been described with reference to embodiments illustrated in the attached drawings, equivalents or substitutions may be employed without departing from the scope of the invention as recited in the claims. Components illustrated and described herein are examples of devices and components that may be used to implement embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A wearable gesture detector, comprising:
  a wristband;
  a plurality of pressure-sensitive conductive pads coupled to the wristband, the plurality of pressure-sensitive conductive pads being configured to detect epidermal deformations caused by muscular contraction or extension during a hand gesture, wherein the pressure-sensitive conductive pads are conductive and variably resistive;

a motion sensor configured to detect changes in orientation during the hand gesture;
a controller configured to collect hand gesture data samples based on the epidermal deformations detected by the plurality of pressure-sensitive conductive pads, the controller being further configured to collect hand orientation data in the form of quaternion samples based on the changes in orientation detected by the motion sensor;
a fabric layer covering the plurality of pressure-sensitive conductive pads causing the plurality of pressure-sensitive pads to be in indirect contact with a user's skin, wherein the fabric layer increases sensitivity to changes in capacitance resulting from epidermal deformations detectable by the plurality of pressure-sensitive conductive pads; and
a wireless transmitter configured to send the hand gesture data samples and the hand orientation data to a data utility device for additional processing, wherein the quaternion samples are converted into yaw, pitch, and roll information for the data utility device before or after transmission
wherein the additional processing further includes: determining a hand gesture based on the hand gesture data samples and the hand orientation data.

2. The wearable gesture detector of claim 1, wherein the plurality of pressure-sensitive conductive pads are formed from portions of a pressure-sensitive conductive sheet.

3. The wearable gesture detector of claim 1, wherein the plurality of pressure-sensitive conductive pads include at least three pressure-sensitive conductive pads located along: (i) a bottom portion of the wristband configured to contact a ventral surface of a forearm or wrist or (ii) a top portion of the wristband configured to contact a dorsal surface of the forearm or wrist.

4. The wearable gesture detector of claim 1, wherein the motion sensor is a multi-axis motion sensor.

5. The wearable gesture detector of claim 4, wherein the multi-axis motion sensor includes an at least 3-axis gyroscope, an at least 3-axis accelerometer, and an at least 3-axis magnetometer.

6. The wearable gesture detector of claim 1, wherein the data utility device comprises at least one of a personal computer, a mobile device, a console, a smart television, a robotics controller, or a kinematics controller.

7. The wearable gesture detector of claim 1, wherein the quaternion samples are computed using an attitude and heading reference system (AHRS) algorithm.

8. The wearable gesture detector of claim 7, wherein the AHRS algorithm is a Madgwick algorithm or a Mahony algorithm.

9. A gesture controlled system, comprising:
a wearable gesture detector, including:
a wristband;
a plurality of pressure-sensitive conductive pads coupled to the wristband, the plurality of pressure-sensitive conductive pads being configured to detect epidermal deformations caused by muscular contraction or extension during a hand gesture, wherein the pressure-sensitive conductive pads are conductive and variably resistive;
a motion sensor configured to detect changes in orientation during the hand gesture;
a controller configured to collect hand gesture data samples based on the epidermal deformations detected by the plurality of pressure-sensitive conductive pads, the controller being further configured to collect hand orientation data in the form of quaternion samples based on the changes in orientation detected by the motion sensor;
a fabric layer covering the plurality of pressure-sensitive conductive pads causing the plurality of pressure-sensitive pads to be in indirect contact with a user's skin, wherein the fabric layer increases sensitivity to changes in capacitance resulting from epidermal deformations detectable by the plurality of pressure-sensitive conductive pads; and
a wireless transmitter configured to transmit the hand gesture data samples and the hand orientation data, wherein the quaternion samples are converted into yaw, pitch, and roll information before or after transmission; and a data utility device configured to:
receive the hand gesture data samples and the hand orientation data;
determine a hand gesture based on the hand gesture data samples and the hand orientation data; and
perform one or more operations based on the hand gesture.

10. The gesture controlled system of claim 9, wherein the plurality of pressure-sensitive conductive pads are formed from portions of a pressure-sensitive conductive sheet.

11. The gesture controlled system of claim 9, wherein the plurality of pressure-sensitive conductive pads include at least three pressure-sensitive conductive pads located along: (i) a bottom portion of the wristband configured to contact a ventral surface of a forearm or wrist or (ii) a top portion of the wristband configured to contact a dorsal surface of the forearm or wrist.

12. The gesture controlled system of claim 9, wherein the motion sensor is a multi-axis motion sensor.

13. The gesture controlled system of claim 12, wherein the multi-axis motion sensor includes an at least 3-axis gyroscope, an at least 3-axis accelerometer, and an at least 3-axis magnetometer.

14. The gesture controlled system of claim 9, wherein the data utility device comprises at least one of a personal computer, a mobile device, a console, a smart television, a robotics controller, or a kinematics controller.

15. The gesture controlled system of claim 9, wherein the one or more operations performed based on the hand gesture include at least one of:
executing a program instruction;
generating a control signal based on the hand gesture; or
generating a graphical output indicative of the hand gesture.

16. The gesture controlled system of claim 9, wherein the quaternion samples are computed using an attitude and heading reference system (AHRS) algorithm.

17. The gesture controlled system of claim 16, wherein the AHRS algorithm is a Madgwick algorithm or a Mahony algorithm.

* * * * *